(12) United States Patent
Park (10) Patent No.: US 12,441,213 B2
(45) Date of Patent: Oct. 14, 2025

(54) SYSTEM FOR PREHEATING A FUEL CELL FOR A FUEL CELL VEHICLE AND A METHOD OF CONTROLLING SAME

(71) Applicants: HYUNDAI MOTOR COMPANY, Seoul (KR); KIA CORPORATION, Seoul (KR)

(72) Inventor: Young Kyu Park, Hwaseong-si (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 568 days.

(21) Appl. No.: 18/076,192

(22) Filed: Dec. 6, 2022

(65) Prior Publication Data
US 2024/0034196 A1    Feb. 1, 2024

(30) Foreign Application Priority Data
Jul. 27, 2022  (KR) .................. 10-2022-0093282

(51) Int. Cl.
*B60L 58/40*        (2019.01)
*B60L 50/75*        (2019.01)
(Continued)

(52) U.S. Cl.
CPC .............. *B60L 58/40* (2019.02); *B60L 50/75* (2019.02); *B60L 58/31* (2019.02); *B60L 58/34* (2019.02); *H01M 8/04007* (2013.01); *H01M 8/04225* (2016.02); *H01M 8/04268* (2013.01); *H01M 8/04302* (2016.02); *H01M 8/04701* (2013.01); *H01M 16/006* (2013.01); *B60L 2240/62* (2013.01); *B60L 2240/80* (2013.01); *H01M 2220/20* (2013.01); *H01M 2250/20* (2013.01)

(58) Field of Classification Search
None
See application file for complete search history.

(56) References Cited

U.S. PATENT DOCUMENTS 10,828,957 B2    11/2020    Hori
11,349,138 B2    5/2022    Ryu
(Continued)

FOREIGN PATENT DOCUMENTS

JP    2009280063 A        12/2009
JP    2010-028963 A   *   2/2010
(Continued)

*Primary Examiner* — Jonathan Crepeau
(74) *Attorney, Agent, or Firm* — Lempia Summerfield Katz LLC (57) ABSTRACT

Proposed are a system for preheating a fuel cell for a fuel cell vehicle and a method controlling the system. An information collector collects start pattern information regarding a start pattern of a driver including start dates, positions, and times of a fuel cell vehicle when the vehicle is started. A controller classifies a start date in the start pattern information of the driver as a weekday group or a weekend group, classifies a start position in which the start of the vehicle is concentrated as a position group, classifies a start time in which the start of the vehicle is concentrated as a time group, deduces a predicted next start time based on each group when the vehicle is stopped, and controls a temperature increase of a fuel cell based on the predicted next start time when the fuel cell is stopped.

15 Claims, 7 Drawing Sheets

(51) Int. Cl.
*B60L 58/31* (2019.01)
*B60L 58/34* (2019.01)
*H01M 8/04007* (2016.01)
*H01M 8/04223* (2016.01)
*H01M 8/04225* (2016.01)
*H01M 8/04302* (2016.01)
*H01M 8/04701* (2016.01)
*H01M 16/00* (2006.01)

(56) References Cited

U.S. PATENT DOCUMENTS

| | | | | |
|---|---|---|---|---|
| 2003/0162063 A1* | 8/2003 | Yoshizawa | ............ | H01M 8/241 |
| | | | | 429/413 |
| 2009/0286110 A1* | 11/2009 | Yoshida | ............ | H01M 8/04029 |
| | | | | 429/444 |
| 2011/0003215 A1* | 1/2011 | Tanaka | ................ | H01M 8/0441 |
| | | | | 429/413 |
| 2018/0019485 A1* | 1/2018 | Riley | ................ | H01M 8/04231 |
| 2019/0176570 A1 | 6/2019 | Hori | | |
| 2020/0153007 A1 | 5/2020 | Ryu | | |
| 2023/0268526 A1* | 8/2023 | Meyer | ............... | H01M 8/04007 |
| | | | | 429/429 |

FOREIGN PATENT DOCUMENTS

| | | | | |
|---|---|---|---|---|
| JP | 2019102021 A | 6/2019 | | |
| KR | 20200055287 A | 5/2020 | | |
| WO | WO-2009036836 A1 * | 3/2009 | ........ | H01M 8/04253 |

* cited by examiner

| Start Pattern Information | | | | |
|---|---|---|---|---|
| Date | Weekday/ Holiday | Start Point in Time | Latitude(°) | Longitude(°) |
| 2021-10-21 | Weekday | 07:12 | 34.9511 | 127.4872 |
| 2021-10-21 | Weekday | 18:05 | 34.7506 | 127.4893 |
| 2021-10-22 | Weekday | 07:03 | 34.9502 | 127.4892 |
| 2021-10-22 | Weekday | 17:58 | 34.7503 | 127.4875 |
| 2021-10-23 | Holiday | 09:12 | 34.9504 | 127.4372 |
| 2021-10-23 | Holiday | 12:07 | 34.9511 | 127.4276 |
| 2021-10-23 | Holiday | 15:03 | 34.7506 | 127.4176 |
| 2021-10-25 | Weekday | 07:10 | 34.9506 | 127.4872 |
| ... | ... | ... | ... | ... |

| Position Group | Representative Coordinates | Weekday/Holiday | Start Point in Time | Latitude(°) | Longitude(°) |
|---|---|---|---|---|---|
| 1 | 34.9508 127.4892 | Weekday | 18:05 | 34.9511 | 127.4872 |
| | | Weekday | 07:12 | 34.7506 | 127.4893 |
| | | Weekday | 17:58 | 34.9502 | 127.4892 |
| | | Weekday | 07:03 | 34.7503 | 127.4875 |
| | | Holiday | 09:12 | 34.9504 | 127.4372 |
| | | ... | ... | ... | ... |
| 2 | 34.7508 127.5893 | Holiday | 12:07 | 34.7532 | 127.4176 |
| | | Holiday | 15:03 | 34.7506 | 127.4176 |
| | | Weekday | 07:10 | 34.9506 | 127.4872 |
| ... | ... | ... | ... | ... | ... |

| Time Group | Weekday/Holiday | Predicted Start Time | Start Time in Time Group |
|---|---|---|---|
| 1 | Weekday | 06:45 | 06:30 |
| | | | 07:12 |
| | | | 07:06 |
| | | | 06:45 |
| | | | 06:59 |
| | | | ... |
| 2 | Weekday | 13:14 | 13:16 |
| | | | 12:58 |
| | | | 12:59 |
| ... | ... | ... | ... |

SYSTEM FOR PREHEATING A FUEL CELL FOR A FUEL CELL VEHICLE AND A METHOD OF CONTROLLING SAME

CROSS-REFERENCE TO RELATED APPLICATION

The present application claims priority to Korean Patent Application No. 10-2022-0093282, filed on Jul. 27, 2022, the entire contents of which are incorporated herein for all purposes by this reference.

BACKGROUND

Technical Field

The present disclosure relates, generally, to a system for preheating a fuel cell for a fuel cell vehicle and a method of controlling the same and, more particularly, to a system for preheating a fuel cell for a fuel cell vehicle, the system being able to preheat a fuel cell of a vehicle by estimating a start point in time of cold start control based on start pattern information of a vehicle driver, and a method controlling the system.

Description of the Related Art

Recently, due to environmental issues of internal combustion engine (ICE) vehicles, the distribution of environmentally friendly vehicles, such as electric vehicles (EVs), is increasing. In general, electric vehicles refer to vehicles that travel using driving force of a motor powered by electric energy.

Such electric vehicles may include hybrid electric vehicles (HEVs) that provide driving force to a motor using electric energy charged in a high voltage battery together with a conventional internal combustion engine (ICE), fuel cell electric vehicles (FCEVs) that provide driving force to a motor using electric energy generated from a fuel cell, and the like.

In particular, a fuel cell mounted on a fuel cell electric vehicle refers to a device that generates electric energy by electrochemical reactions inside a fuel cell stack by using hydrogen and oxygen supplied from external sources.

A fuel cell system used in a fuel cell vehicle includes a fuel cell stack in which a plurality of fuel cells used as a power source are stacked on each other, a fuel supply system supplying hydrogen serving as fuel to the fuel cell stack, an air supply system supplying oxygen serving as an oxidizer necessary for electrochemical reactions, a heat management system using a coolant (e.g., cooling water) or the like to control the temperature of the fuel cell stack, and the like.

The fuel supply system compresses hydrogen within a hydrogen tank and supplies the compressed hydrogen from the hydrogen tank to an anode (i.e., a fuel electrode) of the fuel cell stack, whereas the air supply system supplies intake ambient air to a cathode (i.e., an air electrode) of the fuel cell stack by operating an air compressor.

When hydrogen is supplied to the anode of the fuel cell stack, hydrogen is oxidized at the anode, thereby generating hydrogen ions (i.e., protons) and electrons. Protons and electrons generated at this time move to the cathode through an electrolyte membrane and a separator (i.e., a bipolar plate), respectively. At the cathode, water is produced through electrochemical reactions involving protons and electrons moved from the anode and oxygen in the air, and electric energy is produced from the flow of such electrons.

In other words, since moisture (i.e., water) produced by reactions is present inside the fuel cell stack, there may be a problem in that, when the fuel cell stack is exposed to a sub-zero temperature when power generation is stopped, the moisture inside the fuel cell stack may be frozen.

Thus, strategies for cold start control of the fuel cell stack are desired. The cold start control of the related art uses a method of thawing frozen moisture inside the fuel cell stack by performing a low efficiency operation in such a manner that heat generation of the fuel cell stack is maximized or a method of thawing frozen moisture inside the fuel cell stack by operating a heater using power from a high voltage battery as disclosed in related art.

However, the cold start control method of the related art controls a cold start by determining cold start conditions when the fuel cell vehicle is started.

In other words, the related art has a limitation in that a point in time at which the cold start control is started should depend on the attempt of the vehicle driver to start the vehicle. In addition, the load of accessories, such as a heater, is maximized to increase the temperature of the fuel cell stack in the cold start. However, due to low responsiveness characteristic of temperature, output performance is inevitably reduced compared to a requested level of output at an early stage of the cold start (i.e., the problem of a low-efficiency driving section at the early stage of the start).

Accordingly, there is demand for a solution able to overcome the above-described problem of the low-efficiency driving section at the early stage of the start by preheating the fuel cell stack by estimating a point in time at which the vehicle driver starts the vehicle.

The foregoing is intended merely to aid in the understanding of the background of the present disclosure, and is not intended to mean that the present disclosure falls within the purview of the related art that is already known to those ordinarily skilled in the art.

SUMMARY

Accordingly, the present disclosure has been made keeping in mind the above problems occurring in the related art. The present disclosure is intended to propose a system for preheating a fuel cell for a fuel cell vehicle and a method of controlling the system, the system and method being able to preheat the fuel cell of the fuel cell vehicle by estimating a start point in time of cold start control based on start pattern information of a vehicle driver, thereby avoiding a low-efficiency driving section at an early stage of the start.

In order to achieve the above objective, according to one aspect of the present disclosure, there is provided a system for preheating a fuel cell for a fuel cell vehicle. The system may include an information collector collecting start pattern information regarding a start pattern of a vehicle driver including start dates, start positions, and start times of a fuel cell vehicle when the fuel cell vehicle is started. The system may also include a controller classifying a start date in the start pattern information of the vehicle driver as a weekday group or a weekend group, classifying a start position in which a start of the fuel cell vehicle is concentrated as a single position group, classifying a start time in which the start of the fuel cell vehicle is concentrated as a single time group, deducing a predicted next start time based on each of the groups when the fuel cell vehicle is stopped, and controlling a temperature increase of the fuel cell based on the predicted next start time in a case in which the fuel cell is stopped.

When a number of pieces of the collected start pattern information of the vehicle driver exceeds a predetermined first reference value, the information collector may delete information, collected as part of the start pattern information of the vehicle driver, according to a sequence of the collection, thereby controlling the number of pieces of the collected start pattern information of the vehicle driver to remain the same as the predetermined first reference value.

When the fuel cell vehicle is started, the controller may determine whether a current day of week belongs to the weekday group or the weekend group and classify the position group and the time group according to a result of the determination.

The controller may classify the position group and the time group according to the result of the determination. Each of the groups may include one or more position groups and one or more time groups, and the time groups may be classified as a plurality of time groups by setting start times at which the start of the fuel cell vehicle is concentrated as a single time group for each of the position groups.

The controller may determine whether or not a position of the fuel cell vehicle belongs to the position group when the fuel cell vehicle is stopped, and when the position of the fuel cell vehicle belongs to the position group when the fuel cell vehicle is stopped, deduce a start time closest to a time at which the fuel cell vehicle is stopped, in the time group, as the predicted next start time.

When the number of pieces of the start pattern information of the vehicle driver collected by the information collector is equal to or greater than a predetermined second reference value, the controller may determine whether or not the position of the fuel cell vehicle belongs to the position group when the fuel cell vehicle is stopped.

The system may further include a battery providing driving energy for the fuel cell vehicle. When a state of charge of the battery is equal to or higher than a predetermined third reference value, the controller may determine whether or not the position of the fuel cell vehicle belongs to the position group when the fuel cell vehicle is stopped.

The controller may set a time preceding the predicted next start time by a predetermined reference time to be a reserved temperature increase time. When a current time reaches the reserved temperature increase time, the controller may control the temperature increase of the fuel cell.

When the current time reaches the reserved temperature increase time of the fuel cell, the controller may determine whether or not an ambient temperature of the fuel cell vehicle is equal to or lower than a predetermined reference temperature. When the ambient temperature of the fuel cell vehicle is equal to or lower than the predetermined reference temperature, the controller may control the temperature increase of the fuel cell.

The controller may set a target temperature of the temperature increase based on a degree of degradation of the fuel cell and control the temperature increase of the fuel cell to follow a predetermined target temperature.

The controller may control the temperature increase of the fuel cell to follow the predetermined target temperature by deducing the temperature increase time of the fuel cell based on the target temperature and variably controlling the temperature increase time of the fuel cell based on a data map prepared according to a current temperature of the fuel cell.

When the fuel cell vehicle is not started in a period from the reserved temperature increase time of the fuel cell to the predicted next start time, the controller may stop the controlling before a next start.

The controller may determine a case to be a control failure when the fuel cell vehicle is not started in the period from the reserved temperature increase time of the fuel cell to the predicted next start time. The controller may stop the controlling before the next start when a number of control failures exceeds a predetermined fourth reference value.

The system may further include a display unit for receiving information regarding the predicted next start time from the controller and for displaying the received information to the vehicle driver. When the predicted next start time is deduced, the controller may transmit the information regarding the predicted next start time to the display unit.

According to another aspect of the present disclosure, there is provided a method of controlling the herein-described system. The method may include: collecting, by the information collector, start pattern information of the vehicle driver including start dates, start positions, and start times of the fuel cell vehicle when the fuel cell vehicle is started; classifying, by the controller, the start date in the start pattern information of the vehicle driver as the weekday group or the weekend group; classifying, by the controller, the start position in which the start of the fuel cell vehicle is concentrated, in the start pattern information of the vehicle driver, as the single position group; classifying, by the controller, the start time in which the start of the fuel cell vehicle is concentrated, in the start pattern information of the vehicle driver, as the single time group; deducing, by the controller, the predicted next start time based on each of the groups when the fuel cell vehicle is stopped; and controlling, by the controller, the temperature increase of the fuel cell based on the predicted next start time when the fuel cell is stopped.

According to the present disclosure, the system for preheating a fuel cell for a fuel cell vehicle and the method of controlling the system have the following effects.

First, a start point in time of the cold start control may be estimated independently of the attempt of a vehicle driver to start the vehicle by estimating a predicted next start time based on start pattern information of the vehicle driver.

Second, the cold start may be performed at a higher temperature by preheating the fuel cell by estimating the start point in time of the cold start control, thereby avoiding a low-efficiency driving section at an early stage of the start.

Third, when the fuel cell is preheated by estimating the start point in time of the cold start control, the temperature increase of the fuel cell may be controlled to follow a predetermined temperature-increase target temperature, thereby obtaining a sufficient time necessary for the temperature increase of the fuel cell.

BRIEF DESCRIPTION OF THE DRAWINGS

The above and other objectives, features, and other advantages of the present disclosure should be more clearly understood from the following detailed description when taken in conjunction with the accompanying drawings, in which.

DETAILED DESCRIPTION

It should be further understood that the terms "comprise", "include", "have", and the like, when used in this specification, specify the presence of stated features, integers, steps, operations, elements, components, and/or combinations thereof but do not preclude the presence or addition of one or more other features, integers, steps, operations, elements, components, and/or combinations thereof.

In addition, it should be understood that, although the terms "first", "second", and the like, may be used herein to describe various elements, these elements should not be limited by these terms. These terms are only used to distinguish one element from another element.

In the description of the present disclosure, when it is determined that the detailed description of the related art would obscure the gist of the present disclosure, the detailed description thereof is omitted. In addition, the attached drawings are merely intended to be able to readily aid in understanding the embodiments disclosed in this specification, and thus the technical idea disclosed herein is not limited by the attached drawings, and it should be understood to include all changes, equivalents, and substitutions included in the idea and technical scope of the present disclosure.

When a component, device, element, or the like of the present disclosure is described as having a purpose or performing an operation, function, or the like, the component, device, or element should be considered herein as being "configured to" meet that purpose or to perform that operation or function.

A controller 200, according to an embodiment disclosed in this specification, may include a communication device communicating with another controller or a sensor in order to control a function which the controller 200 manages, a memory storing an operating system, logic instructions, input/output information, and the like, and one or more processors performing determination, calculation, decision, and the like for controlling the function.

Hereinafter, configurations and operating principles of a plurality of embodiments of the present disclosure disclosed herein are described in detail with reference to the accompanying drawings, in which identical or similar constituent elements are given the same reference numerals regardless of the reference numerals of the drawings, and repeated description thereof are omitted.

Figure 1:
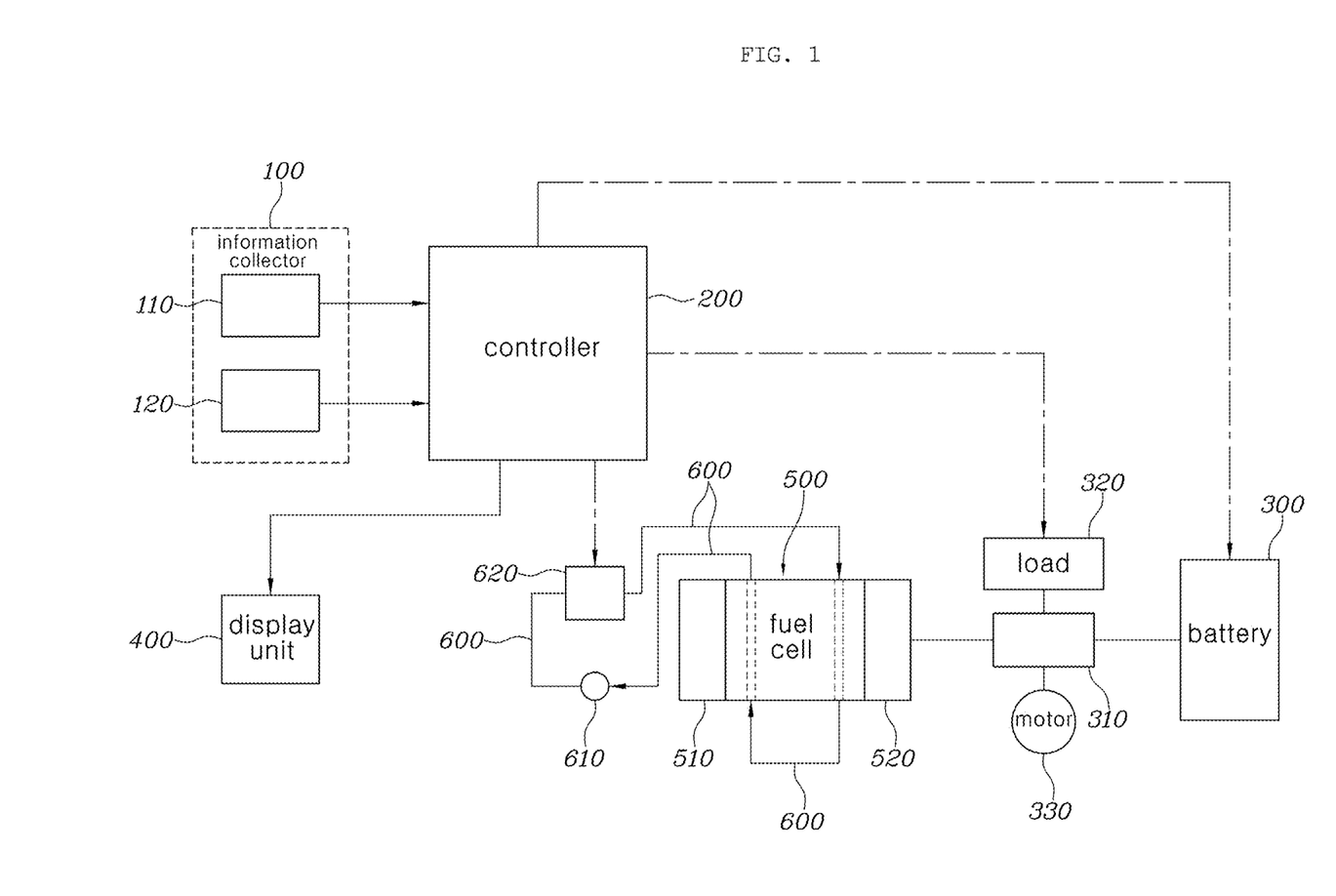
FIG. 1 is a block diagram illustrating a system for preheating a fuel cell for a fuel cell vehicle according to an embodiment of the present disclosure.
Figure 2:
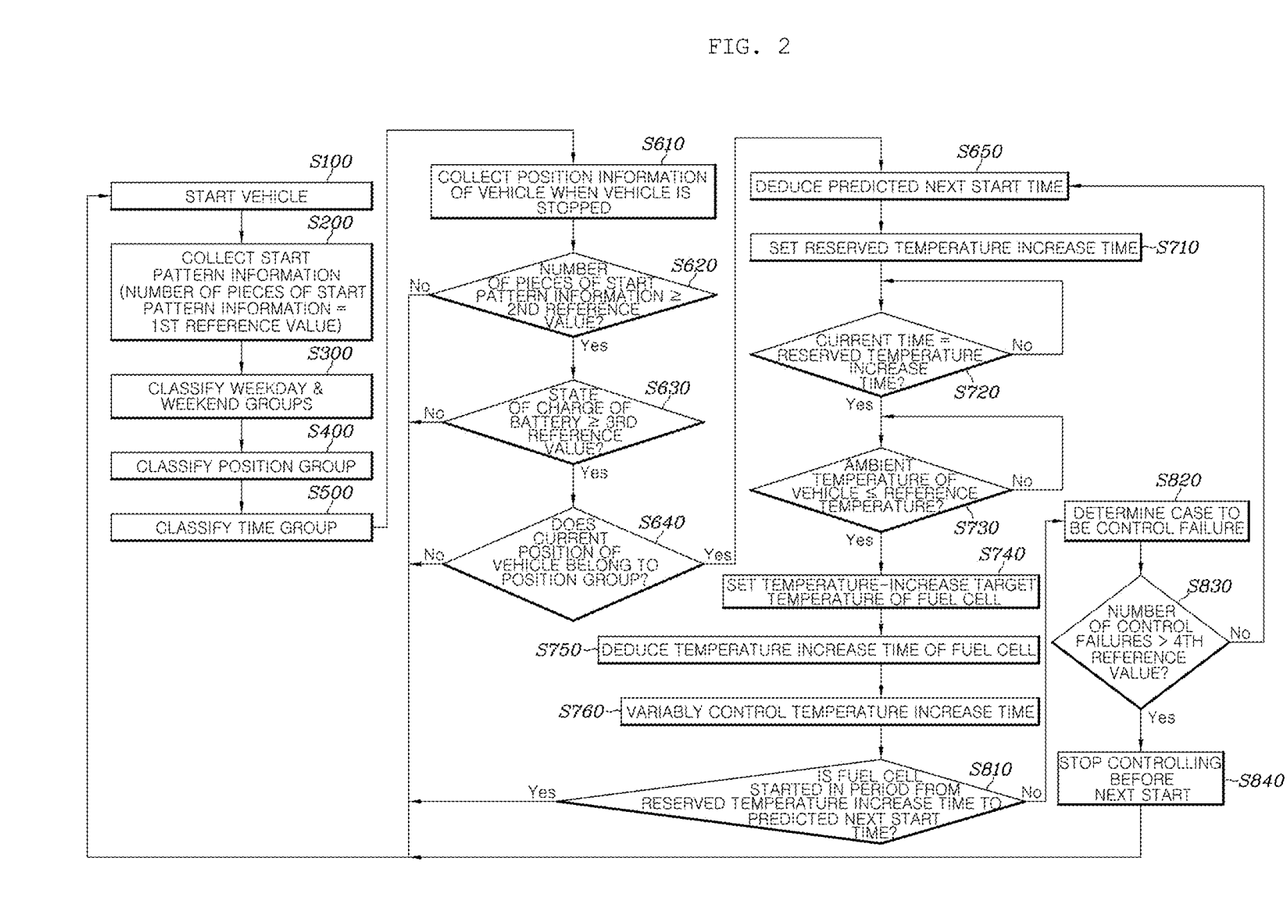
FIG. 2 is a flowchart illustrating a method of preheating a fuel cell for a fuel cell vehicle according to an embodiment of the present disclosure.
Figure 3:
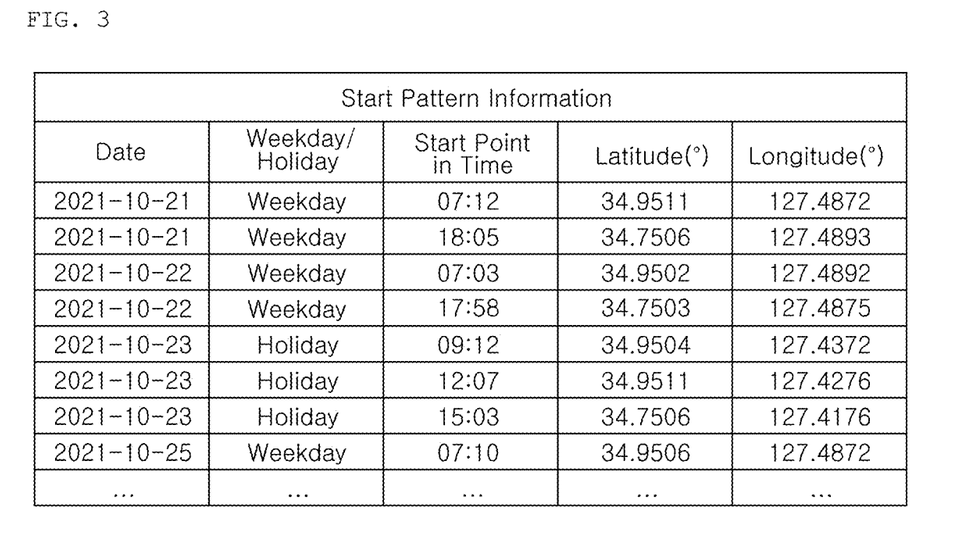
FIG. 3 is a table illustrating start pattern information of a vehicle driver collected by the information collector.
Figure 4:
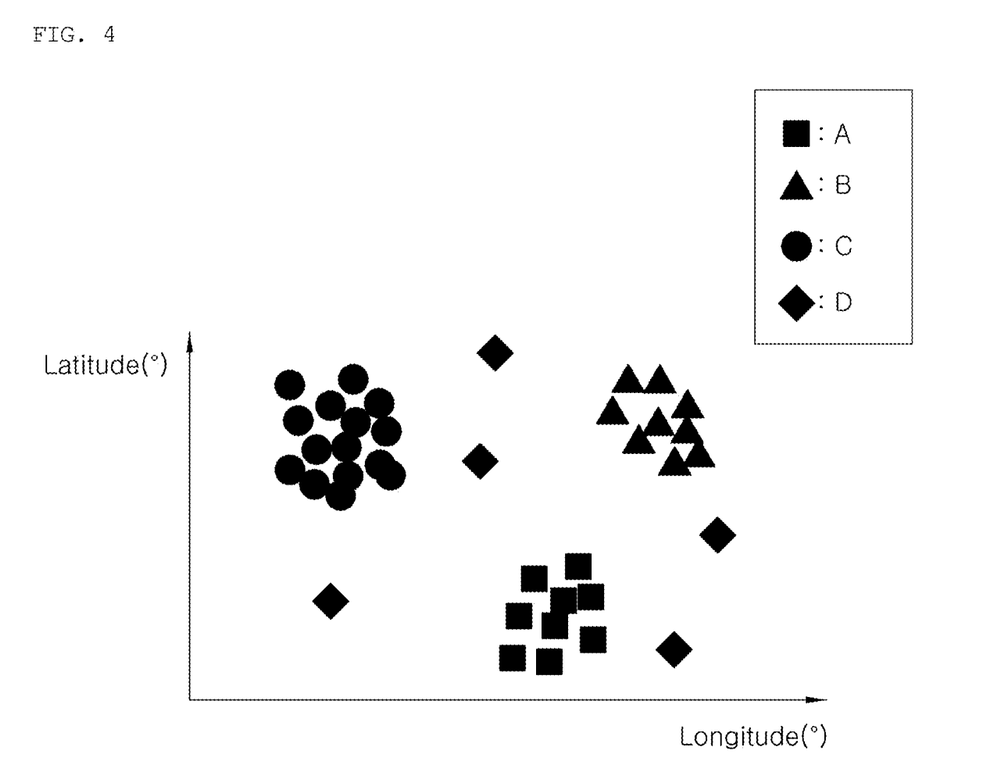
FIG. 4 is a graph illustrating start positions in each of which the start of the vehicle is concentrated, the start positions being classified as position groups.
Figure 5:
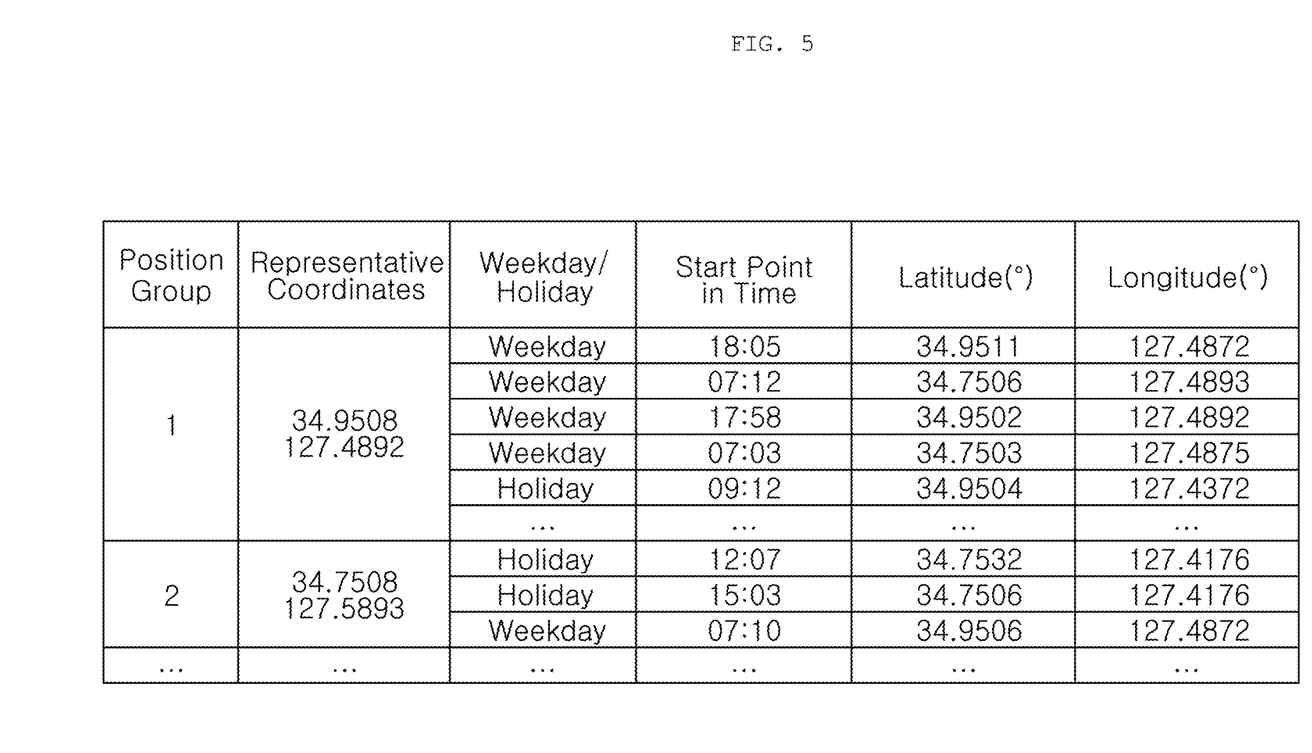
FIG. 5 is a table illustrating a plurality of groups classified by setting times in which the start of the vehicle is concentrated as a single time group for each of the position groups in which the time groups are classified.
Figure 6:
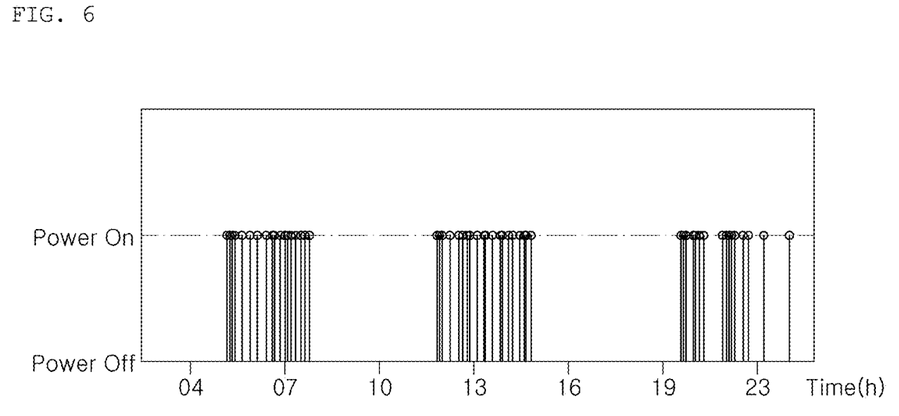
FIG. 6 is a graph illustrating start times in each of which the start of the vehicle is concentrated, the start times being classified as time groups.
Figure 7:
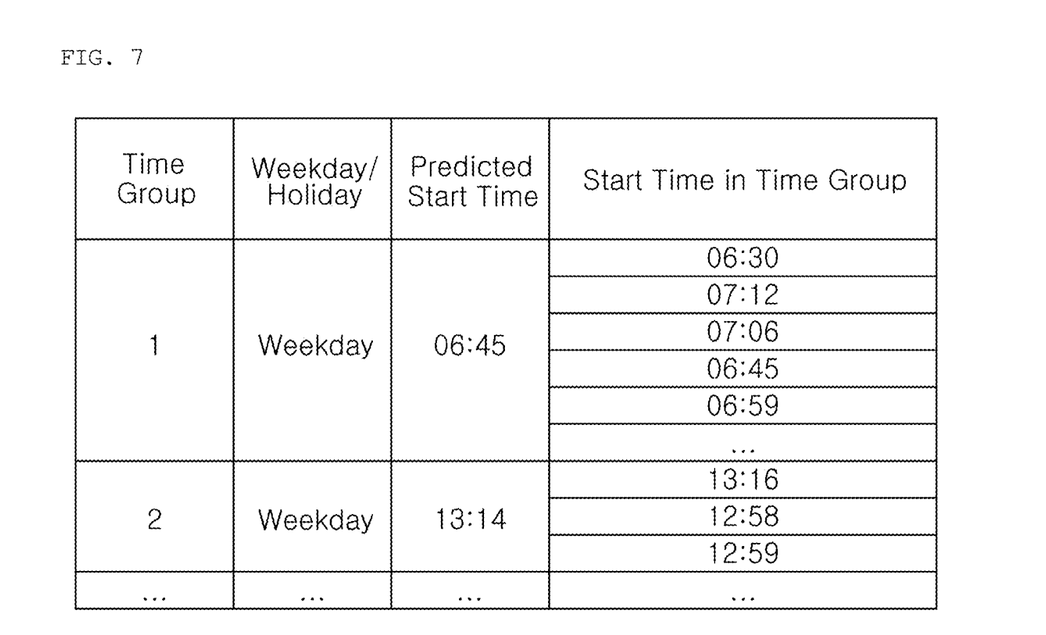
FIG. 7 is a table illustrating a result finally classified according to FIGS. 3-6.

FIG. 1 is a block diagram illustrating a system for preheating a fuel cell 500 for a fuel cell vehicle according to an embodiment of the present disclosure. FIG. 2 is a flowchart illustrating a method of preheating the fuel cell 500 for a fuel cell vehicle according to an embodiment of the present disclosure. FIG. 3 is a table illustrating start pattern information of a vehicle driver collected by an information collector 100. FIG. 4 is a graph illustrating start positions in each of which the start of the vehicle is concentrated, the start positions being classified as position groups. FIG. 5 is a table illustrating a plurality of groups classified by setting times in which the start of the vehicle is concentrated as a single time group for each of the position groups in which the time groups are classified. FIG. 6 is a graph illustrating start times in each of which the start of the vehicle is concentrated, the start times being classified as time groups. FIG. 7 is a table illustrating a result finally classified according to FIGS. 3-6.

Referring to FIG. 1, the system for preheating the fuel cell 500 for the vehicle including the fuel cell 500 (hereinafter, referred to as the "fuel cell vehicle") according to the present disclosure includes the information collector 100 and the controller 200. When a fuel cell vehicle is started, the information collector 100 collects start pattern information regarding the start pattern of a vehicle driver, including start dates, start positions, and start times of the vehicle. The controller 200 classifies a start date in the start pattern information (hereinafter, referred to as the "start pattern information") of the vehicle driver as a weekday group or a weekend group, classifies a start position in which the start of the vehicle is concentrated as a single position group, classifies a start time in which the start of the vehicle is concentrated as a single time group, deduces a predicted next start time based on each of the groups when the fuel cell vehicle is stopped, and controls the temperature increase of the fuel cell 500 based on the predicted next start time in a case in which the fuel cell 500 is stopped.

For a better understanding of the present disclosure, respective components of the system for preheating the fuel cell 500 according to the present disclosure are described together with main components of a system including the fuel cell 500 (hereinafter, referred to as a "fuel cell system") used in a typical fuel cell vehicle with reference to FIG. 1.

First, the fuel cell vehicle may include the fuel cell 500 supplying driving energy to a motor 330 of the vehicle, a high voltage junction box 310 controlling power supplied to a load 320 of the vehicle by receiving power from the fuel cell 500, and the like. The fuel cell vehicle may further include a battery 300 as an auxiliary power source.

Herein, the load 320 of the vehicle may be understood as including a variety of high voltage components for the vehicle, such as a heater, an air conditioning system, and a cooling fan, which require the supply of power thereto, and a navigation device 110 used to assist in the driving of the vehicle, and the like.

For reference, the vehicle heater may be understood as including a cathode oxidation depletion (COD) heater and an end-cell heater, in addition to a heater for warming the inside of the vehicle. The COD heater serves to remove hydrogen and oxygen remaining inside the fuel cell 500, whereas the end-cell heater serves to prevent water produced by electrochemical reactions from remaining in an area (i.e., an end cell) positioned outside unit cells of the fuel cell 500. The controller 200 according to the present disclosure described below may use the COD heater or the end-cell heater to increase the temperature of the fuel cell 500.

In addition, the navigation device 110 refers to a device that collects information (e.g., information regarding the position of the vehicle and the current time or date) for auxiliary driving of the vehicle and provides the collected information to a vehicle user. The navigation device 110 may be understood as being included in the information collector 100 of the system for preheating the fuel cell 500 for a fuel cell vehicle according to the present disclosure. In FIG. 1, the information collector 100, including the navigation device 110, is illustrated separately from the load 320 of the vehicle only for a better understanding of the present disclosure, but the features of the present disclosure should not be limited thereto.

In addition, the information collector 100 of the system for preheating the fuel cell 500 for a fuel cell vehicle according to the present disclosure may be understood as including the navigation device 110 or a substitute thereof. In other words, the navigation device 110 illustrated in FIG. 1 is only an example for a better understanding of the present disclosure, but the information collector 100 according to the present disclosure should not be understood as being limited to the navigation device 110.

In addition, as illustrated in FIG. 1, the information collector 100 of the system for preheating the fuel cell 500 for a fuel cell vehicle according to the present disclosure may further include an ambient temperature sensor 120 measuring the ambient temperature of the vehicle. The ambient temperature sensor 120 is described in detail below.

The information collector 100 of the system for preheating the fuel cell 500 for a fuel cell vehicle according to the present disclosure collects the start pattern information of the vehicle driver when the fuel cell 500 is started. The start pattern information of the vehicle driver includes start dates, start positions, and start times of the vehicle.

Specifically, these features are described with reference to FIG. 3. FIG. 3 is a table illustrating the start pattern information of the vehicle driver collected by the information collector 100.

As illustrated in FIG. 3, start dates of the vehicle may be expressed as information values indicated by year, month, and day. Start times of the vehicle may be expressed as information values using units of hours expressed by 24 hours (0 to 24 o'clock) and units of minutes expressed by 60 minutes (0 to 60 minutes).

In addition, start positions of the vehicle may use information regarding coordinate values expressed as a latitude and a longitude. The latitude refers to a position indicating an angular distance north or south of the earth's equator, whereas the longitude refers to a position indicating an angular distance east or west from the Prime Meridian at the Greenwich Astronomical Observatory. The coordinate value information corresponds to the geographic coordinate system used worldwide, and a detailed description thereof is omitted.

In other words, the information collector 100 according to the present disclosure collects the information regarding start dates, start positions, and start times of the vehicle when the vehicle is started as illustrated in FIG. 3, and transmits the information to the controller 200 according to the present disclosure as illustrated in FIG. 1.

The controller 200 according to the present disclosure classifies the received start pattern information of the vehicle driver as a weekday group or a weekend group, a position group, and a time group. The weekday group or the weekend group may be classified as illustrated in FIG. 3, based on start dates in the start pattern information of the vehicle driver.

The position group and the time group are described with reference to FIGS. 4 and 6. FIG. 4 is a graph illustrating start positions in each of which the start of the vehicle is concentrated, the start positions being classified as position groups. FIG. 6 is a graph illustrating start times in each of which the start of the vehicle is concentrated, the start times being classified as time groups.

First, in FIG. 4, each of A to C indicates a position group, whereas D corresponds to noise not classified as any of the position groups. In other words, when the start of the vehicle is concentrated at similar positions, the similar positions are classified as A, B, and C groups indicated by A to C. The classification may be based on, for example, the number of pieces of information included within the maximum distance between pieces of information regarding start positions or the maximum distance from information regarding the center. The process of this classification is well-known in the art related to classification of data, and thus a detailed description thereof is omitted.

A case, such as D, not belonging to any position group is regarded as noise and is not included in data of any position group. In other words, when the start pattern of the vehicle driver is not periodic, no position group is generated, and thus an unnecessary decision may be advantageously avoided.

Next, in FIG. 6, the x-axis represents 24 hours of a day, whereas the y-axis represents on and off states of the vehicle. Referring to FIG. 6, it may be appreciated that the start of the vehicle is frequently performed at about 7, 13, and 23 o'clock. Thus, three (3) time groups are formed at about 7, 13, and 23 o'clock.

For reference, although noise is not illustrated in FIG. 6, noise may also be generated when the time groups are classified as in the above case of the position groups. In this case, the noise is not included in the data of the time groups, and thus an unnecessary decision may be advantageously avoided once again.

Subsequently, when the fuel cell vehicle is stopped, the controller 200 according to the present disclosure may deduce a predicted next start time based on each of the above-classified groups. Based on this predicted next start time, the temperature increase of the fuel cell 500 may be controlled when the fuel cell 500 is stopped.

The expression "when the fuel cell vehicle is stopped" should be understood as a state in which a key is disconnected from the vehicle to stop the operation of the fuel cell vehicle. Even when the key is disconnected from the vehicle, a main relay (not shown) provided in the high voltage junction box 310 of the fuel cell system may be connected to a high voltage line (not shown). When the main relay (not shown) is connected to the high voltage line (not shown) as above, electric energy generated by the operation of the fuel cell 500 may be transferred to the load 320 of the vehicle, and thus the temperature increase of the fuel cell 500 may be controlled.

In other words, according to the present disclosure, when the fuel cell vehicle is stopped, the vehicle remains stopped since the key is disconnected from the vehicle. However, in this state, the main relay (not shown) is connected to the high voltage line (not shown), and thus the fuel cell 500 may be operated.

In addition, the state in which the fuel cell 500 is stopped may be understood as a state in which the fuel cell 500 is not operated when the fuel cell vehicle is stopped.

Thus, even in the case that no key is fitted to the fuel cell vehicle, the main relay (not shown) may be set to be connected to the high voltage line (not shown), and thus the control according to the present disclosure may be performed. In other words, when a cold start is required due to a low ambient temperature as in the winter, the fuel cell 500 may be preheated by controlling the temperature increase of the fuel cell 500 before activating the cold start. Thus, the cold start is performed at a higher temperature, and thus an effect of avoiding the low-efficiency driving section may be avoided at an early stage of the start.

A specific control principle of deducing a predicted next start time based on each group is described below.

In addition, the fuel cell system used in a typical fuel cell vehicle includes: the fuel supply system supplying hydrogen from a hydrogen tank to an anode 510 of a stack of the fuel cell 500 by decompressing compressed hydrogen; the air supply system supplying air to a cathode 520 of the stack of the fuel cell 500 by drawing ambient air by actuating an air compressor (not shown); a heat management system using cooling air or the like to control the temperature of the fuel cell 500; and the like.

The heat management system serves to circulate a coolant through a cooling line 600 by actuating a cooling unit 620, thereby preventing the fuel cell 500 from being overheated by electrochemical reactions. In other words, as illustrated in FIG. 1, the heat management system may include the cooling line 600 through which the coolant circulates, the cooling unit 620 provided in the cooling line 600 to cause the coolant to flow, and a coolant temperature sensor 610 measuring the temperature of the coolant. The cooling unit 620 may include a coolant pump and a flow valve.

The controller 200 according to the present disclosure uses the COD heater or the end-cell heater described above when controlling the temperature increase of the fuel cell 500. Heat generated by the COD heater is transmitted to the fuel cell 500 by driving the cooling unit 620 (such as the coolant pump and the flow valve) through the fuel cell 500. Thus, the temperature of the fuel cell 500 may also be increased by heat generated by the operation of the fuel cell 500. Accordingly, there is an advantage in that the temperature of the entire area of the fuel cell 500 may be uniformly increased.

Hereinafter, specific control principles of respective components of the system for preheating the fuel cell 500 for a fuel cell vehicle according to the present disclosure are described in conjunction with the flowchart in FIG. 2.

When the number of pieces of the collected start pattern information of the vehicle driver exceeds a predetermined first reference value, the information collector 100 of the system for preheating the fuel cell 500 for a fuel cell vehicle according to the present disclosure may delete the information collected as part of the start pattern information of the vehicle driver according to the sequence of the collection of the start pattern information. In this manner, the information collector 100 may control the number of pieces of the collected start pattern information of the vehicle driver to remain the same as the predetermined first reference value.

This may be understood to correspond to S200 in FIG. 2. In this regard, "start dates" in the start pattern information of the vehicle driver are described as an example. When based on start dates, the predetermined first reference value may be set to be, for example, three (3) months. The set reference value may be previously stored in a built-in memory (not shown) of the controller 200 according to the present disclosure.

When the information regarding start dates collected by the information collector 100 corresponds to 91, which is greater than 90 corresponding to 3 months (where one month is regarded as 30 days for the sake of brevity), information regarding a first-collected start date is deleted, and thus the total number of pieces of the collected information remains 90.

Since the number of pieces of the start pattern information of the vehicle driver is controlled to remain the same as the predetermined first reference value, it is possible to prevent an unnecessarily large amount of information from being collected, thereby preventing the memory of the controller 200 from being overloaded. In addition, while the oldest information is deleted, the latest (e.g., most recent) information is continuously collected. Thus, the information used to perform the control according to the present disclosure may be advantageously updated with the latest information.

For reference, performing such control may use a queue-type data structure. The data structure refers to a collection or the relationship of specific data values or a function or an instruction applicable to data. The queue type indicates a method of storing data in a first-in first-out (FIFO) method in which data input first is output first.

When the fuel cell vehicle is started, the controller 200 of the system for preheating the fuel cell 500 for a fuel cell vehicle according to the present disclosure may determine whether the current day of the week belongs to the weekday group or the weekend group and classify the position group and the time group according to the result of the determination.

This may be understood as corresponding to steps S300 to S500 in FIG. 2. As described above with reference to FIG. 3, the start pattern information of the vehicle driver collected by the information collector 100 according to the present disclosure is classified as the weekday group or the weekend group, the position group, and the time group by the controller 200 according to the present disclosure.

Specifically, when the fuel cell vehicle is started, the controller 200 according to the present disclosure determines whether the current day of the week belongs to the weekday group or the weekend group.

The weekday group indicates weekdays from Monday to Friday, whereas the weekend group indicates Saturday and Sunday. Differently from the position group or the time group, the weekday group and the weekend group are previously set and stored in the built-in memory (not shown) of the controller 200.

Thus, when the information regarding start dates of the vehicle driver collected by the information collector 100 is transmitted to the controller 200, the controller 200 may determine whether the current day of the week corresponding to a start date belongs to the weekday group or the weekend group.

Subsequently, when the current day of the week is determined to belong to the weekday group or the weekend group in the start of the fuel cell vehicle, the controller 200 according to the present disclosure classifies the position group and the time group in the corresponding group.

For example, in FIG. 3, dates listed as "weekdays" are determined to belong to the weekday group, whereas dates listed as "weekends" are determined to belong to the weekend group. In addition, the information regarding start positions and start times in each of the groups collected by the information collector 100 is transmitted to the controller 200.

The controller 200 of the system for preheating the fuel cell 500 for a fuel cell vehicle according to the present disclosure classifies the position group and the time group according to the result of the determination. Each of the groups may include one or more position groups and one or more time groups. The time groups may be classified as a plurality of time groups by setting start times at which the start of the vehicle is concentrated as a single time group for each of the position groups.

This may be understood as corresponding to steps S400 and S500 in FIG. 2. In other words, as described above with reference to FIG. 4, the position group may be classified as one or more groups, such as group A, group B, and group C. In the same manner, as illustrated in FIG. 6, the time group may also be classified as one or more groups. In contrast, the time group may be classified into a plurality of time groups for each of the position groups.

For example, a plurality of time groups illustrated in FIG. 6 may correspond to group A, group B, or group C in FIG. 4. In other words, a plurality of time groups may be separately generated and classified for each of the position groups.

In other words, when coordinate values (indicating "representative coordinates" illustrated in FIG. 5) representing each of the plurality of position groups are specified as illustrated in FIG. 5, a large amount of information regarding start times is present in the position group corresponding to the representative coordinates. The large amount of information regarding start times as described above is classified again into a plurality of time groups.

As a result, as described above, specific groups are generated and classified according to the sequence of start dates, start positions, and start times of the fuel cell vehicle. Accordingly, there is an advantage in that the start pattern may be more specifically reviewed.

The above-described process of classifying by the controller 200 according to the present disclosure is performed when the vehicle is started. A process of deducing the "predicted next start time" to be described below is performed when the vehicle is stopped.

First, the controller 200 of the system for preheating the fuel cell 500 for a fuel cell vehicle according to the present disclosure determines whether or not the position of the fuel cell vehicle belongs to the position group when the fuel cell vehicle is stopped. When the fuel cell vehicle is stopped and when the position of the fuel cell vehicle belongs to the position group, a start time closest to the time at which the fuel cell vehicle is stopped, in the time groups, may be deduced as a predicted next start time.

This may be understood as corresponding to steps S640 and S650 in FIG. 2. In other words, the controller 200 according to the present disclosure determines whether or not the position of the fuel cell vehicle belongs to the position group at a point in time at which the key is disconnected from the fuel cell vehicle.

When the position of the fuel cell vehicle belongs to the position group, the start time closest to the point in time at which the key is disconnected from the fuel cell vehicle, in the time group according to the corresponding position group, is deduced as the predicted next start time.

The point in time at which the key is disconnected from the fuel cell vehicle indicates a point in time at which the fuel cell vehicle is stopped. "The start time closest to the point in time at which the key is disconnected from the fuel cell vehicle" may be understood as being a start time closest to the point in time at which the key is disconnected from the fuel cell vehicle, among start times after the disconnection of the key from the fuel cell vehicle.

In this regard, these features are described with reference to FIG. 7. FIG. 7 is a table illustrating a result finally classified according to FIGS. 3-6. Referring to "Time Group 1" in FIG. 7, it may be appreciated that start times belonging to Time Group 1 include 6:30 AM, 6:59 AM, and the like, and that a predicted start time is determined to be 6:45 AM.

For example, when the point in time at which the key is disconnected from the fuel cell vehicle is in a period from 6:30 AM to 6:45 AM, the predicted next start time is determined to be 6:45 AM as illustrated in FIG. 7.

Thus, a sufficient time for preheating the fuel cell 500 may be obtained by estimating the predicted next start time in this manner.

When the number of pieces of the start pattern information of the vehicle driver collected by the information collector 100 is equal to or greater than a predetermined second reference value, the controller 200 of the system for preheating the fuel cell 500 for a fuel cell vehicle according to the present disclosure may determine whether or not the position of the fuel cell vehicle belongs to the position group when the fuel cell vehicle is stopped. This may be understood as corresponding to step S620 in FIG. 2.

The system for preheating the fuel cell 500 for a fuel cell vehicle according to the present disclosure is generally intended to obtain a sufficient time for preheating the fuel cell 500 by estimating the predicted next start time by analyzing the start pattern of the vehicle driver.

The start pattern of the vehicle driver is analyzed by a process in which the controller 200 classifies the start pattern information of the vehicle driver collected by the information collector 100 as the weekday group, the weekend group, the position group, and the time group.

Thus, when the number of pieces of the start pattern information of the vehicle driver collected by the information collector 100 is too small, the reliability of the start pattern of the vehicle driver should be reduced. The system for preheating the fuel cell 500 for a fuel cell vehicle according to the present disclosure is intended to increase the reliability of information by setting the minimum number of pieces of information required for analyzing the start pattern of the vehicle driver.

In other words, the "predetermined second reference value" according to the present disclosure may be understood as being the minimum number of pieces of information required for analyzing the start pattern of the vehicle driver.

When the number of pieces of the start pattern information of the vehicle driver collected by the information collector 100 is smaller than the predetermined second reference value, the controller 200 according to the present disclosure does not determine whether or not the position of the fuel cell vehicle belongs to the position group when the fuel cell vehicle is stopped.

In addition, only when the number of pieces of the start pattern information of the vehicle driver additionally collected by the information collector 100 is equal to or greater than the predetermined second reference value when the fuel cell vehicle is started next time, the controller 200 according to the present disclosure determines whether or not the position of the fuel cell vehicle belongs to the position group when the fuel cell vehicle is stopped.

In addition, the system for preheating the fuel cell 500 for a fuel cell vehicle according to the present disclosure may further include the battery 300 providing the driving energy for the vehicle. When the state of charge of the battery 300 is equal to or higher than a predetermined third reference value, the controller 200 may determine whether or not the position of the fuel cell vehicle belongs to the position group when the fuel cell vehicle is stopped. This may be understood as corresponding to step S630 in FIG. 2.

The fuel cell 500 mounted on the fuel cell vehicle has a limitation in that it is not easy to rapidly supply power in response to changes in the output of the vehicle. Thus, in order to respond to such changes in the output of the vehicle, the fuel cell vehicle is generally provided with the high voltage battery 300 (hereinafter, referred to as the "battery 300") to provide driving force to the motor 330.

In other words, in the fuel cell vehicle, the fuel cell 500 correspond to a main power source to provide the driving energy for the fuel cell vehicle by generating electric energy by electrochemical reactions, whereas the battery 300 corresponds to an auxiliary power source to provide the driving energy for the fuel cell vehicle together with the fuel cell 500 serving as the main power source.

In addition, the electric energy generated by the fuel cell 500 is supplied to the load 320 or the battery 300 of the vehicle to drive the load 320 or charge the battery 300. When the load 320 of the vehicle is increasing rapidly, the electric energy charged in the battery 300 is discharged from the battery 300 to supplement the driving energy for the fuel cell vehicle.

As described above, the controller 200 according to the present disclosure may use the COD heater or the end-cell heater to increase the temperature of the fuel cell 500. In addition, when the cooling unit 620 is operated so that heat generated by the COD heater is transmitted to the fuel cell 500, the temperature is also increased by heat generated by the fuel cell 500 through the operation thereof, as described above.

In addition, according to the present disclosure, the expression "when the fuel cell vehicle is stopped" refers to a state in which the vehicle remains stopped, with the key being disconnected from the vehicle, but the fuel cell 500 is operable, with the main relay (not shown) of the fuel cell system being connected to the high voltage line (not shown).

However, even in the case that the main relay (not shown) is connected to the high voltage line (not shown), when it is difficult to operate the fuel cell 500 in some cases, the COD heater, the end-cell heater, and the cooling unit 620 should be operated using the battery 300.

Thus, for reliable control, it is necessary to obtain the state of charge of the battery 300 at a sufficient level by which the COD heater, the end-cell heater, and the cooling unit 620 may be operated. In this regard, the system for preheating the fuel cell 500 for a fuel cell vehicle according to the present disclosure is intended to obtain a sufficient level of the state of charge of the battery 300 by setting a lower limit of the state of charge of the battery 300 for operating the above-described devices.

In other words, according to the present disclosure, the expression "predetermined third reference value" may be understood as being a lower limit of the state of charge of the battery 300 for operating the devices.

When the state of charge of the battery 300 is lower than the predetermined third reference value, the controller 200 according to the present disclosure does not determine whether or not the position of the fuel cell vehicle belongs to the position group when the fuel cell vehicle is stopped.

In addition, when the fuel cell vehicle is next started and then stopped, when the state of charge of the battery 300 is equal to or higher than the predetermined third reference value, the controller 200 according to the present disclosure determines whether or not the position of the fuel cell vehicle belongs to the position group when the fuel cell vehicle is stopped.

Consequently, even when the fuel cell 500 is non-operable, the temperature increase of the fuel cell 500 may be controlled using the battery 300.

The controller 200 of the system for preheating the fuel cell 500 for a fuel cell vehicle according to the present disclosure may set a time preceding the predicted next start time by a predetermined reference time to be a reserved temperature increase time. When the current time reaches the reserved temperature increase time, the controller 200 may control the temperature increase of the fuel cell 500. This may be understood as corresponding to steps S710 and S720 in FIG. 2.

The system for preheating the fuel cell 500 for a fuel cell vehicle according to the present disclosure is intended to preheat the fuel cell 500 before starting the vehicle. Thus, when the predicted next start time is deduced, it is advantageous to control the temperature increase of the fuel cell 500 before the deduced predicted next start time.

Thus, the controller 200 according to the present disclosure sets the time preceding the predicted next start time by the predetermined reference time to be the reserved temperature increase time. The "predetermined reference time" may be a reference value variable depending on control conditions. Specifically, the predetermined reference time may be understood as being a "time taken for the temperature increase of the fuel cell 500" to be described below (hereinafter, the time taken for the temperature increase of the fuel cell 500 is referred to as the "temperature increase time of the fuel cell 500"). The temperature increase time of the fuel cell 500 is described in detail below.

In addition, when the current time reaches the reserved temperature increase time of the fuel cell 500, the controller 200 according to the present disclosure controls the temperature increase of the fuel cell 500.

Consequently, the fuel cell 500 may be preheated before the fuel cell vehicle is next started. Advantageously, a low efficiency operation section at an early stage of the cold start may be avoided.

When the current time reaches the reserved temperature increase time of the fuel cell 500, the controller 200 of the system for preheating the fuel cell 500 for a fuel cell vehicle according to the present disclosure may determine whether or not the ambient temperature of the vehicle is equal to or lower than a predetermined reference temperature, and when the ambient temperature of the vehicle is equal to or lower than the predetermined reference temperature, control the temperature increase of the fuel cell 500. This may be understood as corresponding to step S730 in FIG. 2.

The system for preheating the fuel cell 500 for a fuel cell vehicle according to the present disclosure is intended to preheat the fuel cell 500 to avoid a low efficiency operation section at the early stage of the cold start when the cold start is required due to a low ambient temperature as in the winter.

Thus, even in the case that the current time reaches the reserved temperature increase time of the fuel cell 500, when the ambient temperature of the vehicle does not correspond to a low temperature at which the cold start is required, it is not necessary to control the temperature increase of the fuel cell 500.

In other words, the "predetermined reference temperature" according to the present disclosure may be understood as being an upper limit of the temperature at which the cold start is required.

The ambient temperature of the vehicle may be measured by the ambient temperature sensor 120 illustrated in FIG. 1. Information regarding the ambient temperature of the vehicle measured by the ambient temperature sensor 120 is transmitted to the controller 200 according to the present disclosure. The controller 200 receives the information regarding the ambient temperature of the vehicle and determines whether or not the ambient temperature of the vehicle is equal to or lower than the predetermined reference temperature. In addition, when the ambient temperature of the vehicle is equal to or lower than the predetermined reference temperature, the controller 200 controls the temperature increase of the fuel cell 500.

Consequently, the operation of preheating the fuel cell 500 may be performed when the cold start is required. When the cold start is not required, it is possible to prevent the fuel cell 500 from being preheated, thereby preventing electric energy from being unnecessarily consumed.

The controller 200 of the system for preheating the fuel cell 500 for a fuel cell vehicle according to the present disclosure may set a target temperature in the temperature increase (hereinafter, referred to as a "temperature-increase target temperature") based on the degree of degradation of the fuel cell 500, and control the temperature increase of the fuel cell 500 to follow the predetermined target temperature. This may be understood as corresponding to step S740 in FIG. 2.

The controller 200 may control the temperature increase of the fuel cell 500 to follow the predetermined target temperature by deducing the temperature increase time of the fuel cell 500 based on the target temperature and variably controlling the temperature increase time of the fuel cell 500 based on a data map prepared according to the current temperature of the fuel cell 500. This may be understood as corresponding to steps S750 and S760 in FIG. 2.

The "temperature-increase target temperature of the fuel cell 500 based on the degree of degradation of the fuel cell 500" and the "temperature increase time of the fuel cell 500" are described with reference to Equations 1 and 2.

$$t = \frac{mc(T_{tar} - T_{amb})}{W} = k(T_{tar} - T_{amb}) \quad \text{[Equation 1]}$$

In Equations 1 and 2, "m" indicates the mass of a heating element, "C" indicates the specific heat of the heating element, "$T_{amb}$" indicates the ambient temperature of the vehicle, "$T_{tar}$" indicates the temperature-increase target temperature of the fuel cell according to the ambient temperature of the vehicle, "W" indicates the output of the heating element, and "Q" indicates the thermal energy of the heating element. For reference, the heating element may be understood as being the COD heater, the end-cell heater, or the like for increasing the temperature of the fuel cell 500.

Equation 1 is expressed by arranging Equation 2 with respect to the "temperature increase time t of the fuel cell 500" and then converting "W", "m", and "C" into a proportional factor k.

$$Q = mc(T_{tar} - T_{amb}) = Wt \quad \text{[Equation 2]}$$

In Equation 2, a value obtained by multiplying the output of the heating element by the time is deduced from the same point as the thermal energy Q of the heating element.

In Equation 1, the temperature-increase target temperature $T_{tar}$ of the fuel cell 500 according to the ambient temperature of the vehicle may be determined in the consideration of the degree of degradation of the fuel cell 500 and the efficiency according to the temperature. Thus, the temperature increase time t of the fuel cell 500 before the cold start may be variably controlled in consideration of the ambient temperature of the vehicle and the degree of degradation of the fuel cell 500.

Since the temperature increase time of the fuel cell 500 is variably controlled according to the ambient temperature of the vehicle and the degree of degradation of the fuel cell 500 in this manner, the fuel cell 500 may be more efficiently preheated.

When the fuel cell vehicle is not started in a period from the reserved temperature increase time of the fuel cell 500 to the predicted next start time, the controller 200 of the system for preheating the fuel cell 500 for a fuel cell vehicle according to the present disclosure may stop the controlling before the next start.

Specifically, when the fuel cell vehicle is not started in the period from the reserved temperature increase time of the fuel cell 500 to the predicted next start time, the controller 200 of the system for preheating the fuel cell 500 for a fuel cell vehicle according to the present disclosure may determine the case to be a control failure. When the number of control failures exceeds a predetermined fourth reference value, the controller 200 may stop the controlling before the next start. This may be understood as corresponding to steps S810 to S840 in FIG. 2.

In other words, when the fuel cell vehicle is not started in the period from the reserved temperature increase time of the fuel cell 500 to the predicted next start time, the controller 200 according to the present disclosure may determine the case to be a temporary control failure. Afterwards, the controller 200 according to the present disclosure may deduce the predicted next start time again.

For example, it should be assumed that the predicted next start time is deduced to be 6:45 AM as illustrated in "Time Group 1" in FIG. 7. In addition, even in the case that the temperature increase of the fuel cell 500 is controlled with the reserved temperature increase time being set as 6:35 AM, when the fuel cell vehicle has not been started by 6:45 AM, the controller 200 determines that the control has failed.

The controller 200 according to the present disclosure deduces a start time (6:59 AM) closest to the control failure time (6:45 AM) as the predicted next start time, and performs a series of control steps (the process of steps S710 to S760 and S810 to S820 in FIG. 2) to control the temperature increase of the fuel cell 500 according to the deduced predicted next start time.

In addition, the controller 200 according to the present disclosure accumulates the number of control failures whenever the above-described series of control steps are repeated and stops the controlling before the next start when the number of control failures exceeds the predetermined fourth reference value.

The "predetermined fourth reference value" may be a set value variable depending on control conditions and be stored in the built-in memory (not shown) of the controller 200.

As a result, the system for preheating the fuel cell 500 for a fuel cell vehicle according to the present disclosure may prevent undesired repetition of a control logic by counting the number of control failures and setting a limit to the counted number of control failures. In addition, it is possible to minimize undesired discharge of the battery 300 by preventing the preheating of the fuel cell 500 from being repeated a predetermined number of times or more.

In addition, returning to FIG. 1, the system for preheating the fuel cell 500 for a fuel cell vehicle according to the present disclosure may further include a display unit 400 receiving information regarding the predicted next start time from the controller 200 and displaying the received information to the vehicle driver. When the predicted next start time is deduced, the controller 200 may transmit the information regarding the predicted next start time to the display unit 400.

The display unit 400 may be understood as being a display mounted inside the vehicle or a smartphone or the like of the vehicle driver. When the display unit 400 is the smartphone of the vehicle driver, the controller 200 according to the present disclosure may be set to work in concert with an application installed in the smartphone.

When the predicted next start time is deduced, the controller 200 according to the present disclosure transmits the predicted next start time to the display unit 400. In addition, the display unit 400 displays the information regarding the predicted next start time received from the controller 200 to the vehicle driver.

Since the predicted next start time is deduced by a series of control steps (indicating steps S610 to S650 in FIG. 2) when the fuel cell vehicle is stopped, the predicted next start time is deduced at a point in time at which the vehicle driver disconnects the key from the vehicle after stopping the vehicle.

Thus, at a point in time at which the vehicle driver exits the vehicle after stopping driving the vehicle, the display unit 400 may receive the information regarding the predicted next start time transmitted from the controller 200 and display the information to the vehicle driver.

Consequently, it is advantageously possible to change or add the predicted next start time or cancel preheating the fuel cell 500 before the predicted next start time according to the intention of the vehicle driver. For reference, when the vehicle driver cancels preheating the fuel cell 500, the control according to the present disclosure may be understood as being stopped before the next start.

FIG. 2 is a flowchart illustrating a method of preheating the fuel cell 500 for a fuel cell vehicle according to an embodiment of the present disclosure.

Referring to FIG. 2, a method of controlling the system for preheating the fuel cell 500 for a fuel cell vehicle according to the present disclosure includes: step S200 of collecting, by the information collector 100, start pattern information of a vehicle driver including start dates, start positions, and start times of a fuel cell vehicle when the fuel cell vehicle is started; step S300 of classifying, by the controller 200, a start date in the start pattern information of the vehicle driver as a weekday group or a weekend group; step S400 of classifying, by the controller 200, a start position in which the start of the vehicle is concentrated, in the start pattern information of the vehicle driver, as a single position group; step S500 of classifying, by the controller 200, a start time in which the start of the vehicle is concentrated, in the start pattern information of the vehicle driver, as a single time group; steps S610, S620, S630, S640, and S650 of deducing, by the controller 200, a predicted next start time based on each of the groups when the fuel cell vehicle is stopped; and steps S710, S720, S730, S740, S750, and S760 of controlling, by the controller 200, a temperature increase of the fuel cell 500 based on the predicted next start time when the fuel cell 500 is stopped.

In each of the steps of the method of preheating the fuel cell 500 for a fuel cell vehicle according to the present disclosure, specific control methods and operating principles of the controller 200 are the same as those described herein for the system for preheating the fuel cell 500 for a fuel cell vehicle according to the present disclosure, and thus repetitive descriptions thereof are omitted.

As set forth herein, the system for preheating the fuel cell 500 for a fuel cell vehicle and the method controlling the same according to the present disclosure may deduce the predicted next start time of the fuel cell 500 based on the start pattern information of the vehicle driver. Accordingly, the point in time at which the cold start control is started may be advantageously estimated, independently of the vehicle driver attempting to start the vehicle In addition, the cold start may be performed at a higher temperature by preheating the fuel cell 500 by estimating the start point in time of the cold start control, thereby avoiding a low-efficiency driving section at an early stage of the start. Furthermore, a time necessary for the temperature increase of the fuel cell 500 may be sufficiently obtained by controlling the temperature increase of the fuel cell 500 to follow the temperature-increase target temperature of the fuel cell 500.

Although the embodiments of the present disclosure have been described for illustrative purposes, those ordinarily skilled in the art should appreciate that various modifications, additions, and substitutions may be possible, without departing from the scope and spirit of the present disclosure as disclosed in the accompanying claims.

What is claimed is:

1. A system for preheating a fuel cell for a fuel cell vehicle, the system comprising:
an information collector collecting start pattern information regarding a start pattern of a vehicle driver including start dates, start positions, and start times of the fuel cell vehicle when the fuel cell vehicle is started; and
a controller classifying a start date in the start pattern information of the vehicle driver as a weekday group or a weekend group, classifying a start position in which a start of the fuel cell vehicle is concentrated as a single position group, classifying a start time in which the start of the fuel cell vehicle is concentrated as a single time group, deducing a predicted next start time based on each of the groups when the fuel cell vehicle is stopped, and controlling a temperature increase of the fuel cell based on the predicted next start time in a case in which the fuel cell is stopped.

2. The system of claim 1, wherein, when a number of pieces of the collected start pattern information of the vehicle driver exceeds a predetermined first reference value, the information collector deletes information, collected as part of the start pattern information of the vehicle driver, according to a sequence of the collection, thereby controlling the number of pieces of the collected start pattern information of the vehicle driver to remain the same as the predetermined first reference value.

3. The system of claim 1, wherein, when the fuel cell vehicle is started, the controller determines whether a current day of week belongs to the weekday group or the weekend group and classifies the position group and the time group according to a result of the determination.

4. The system of claim 3, wherein the controller classifies the position group and the time group according to the result of the determination, wherein each of the groups comprises one or more position groups and one or more time groups, and the time groups are classified as a plurality of time groups by setting start times at which the start of the fuel cell vehicle is concentrated as a single time group for each of the position groups.

5. The system of claim 1, wherein the controller determines whether or not a position of the fuel cell vehicle belongs to the position group when the fuel cell vehicle is stopped, and when the position of the fuel cell vehicle belongs to the position group when the fuel cell vehicle is stopped, deduces a start time closest to a time at which the fuel cell vehicle is stopped, in the time group, as the predicted next start time.

6. The system of claim 5, wherein, when the number of pieces of the start pattern information of the vehicle driver collected by the information collector is equal to or greater than a predetermined second reference value, the controller determines whether or not the position of the fuel cell vehicle belongs to the position group when the fuel cell vehicle is stopped.

7. The system of claim 5, further comprising a battery providing driving energy for the fuel cell vehicle, wherein, when a state of charge of the battery is equal to or higher than a predetermined third reference value, the controller determines whether or not the position of the fuel cell vehicle belongs to the position group when the fuel cell vehicle is stopped.

8. The system of claim 1, wherein the controller sets a time preceding the predicted next start time by a predetermined reference time to be a reserved temperature increase time, and when a current time reaches the reserved temperature increase time, controls the temperature increase of the fuel cell.

9. The system of claim 8, wherein, when the current time reaches the reserved temperature increase time of the fuel cell, the controller determines whether or not an ambient temperature of the fuel cell vehicle is equal to or lower than a predetermined reference temperature, and when the ambient temperature of the fuel cell vehicle is equal to or lower than the predetermined reference temperature, controls the temperature increase of the fuel cell.

10. The system of claim 8, wherein the controller sets a target temperature of the temperature increase based on a degree of degradation of the fuel cell and controls the temperature increase of the fuel cell to follow a predetermined target temperature.

11. The system of claim 10, wherein the controller controls the temperature increase of the fuel cell to follow the predetermined target temperature by deducing the temperature increase time of the fuel cell based on the target temperature and variably controlling the temperature increase time of the fuel cell based on a data map prepared according to a current temperature of the fuel cell.

12. The system of claim 8, wherein, when the fuel cell vehicle is not started in a period from the reserved temperature increase time of the fuel cell to the predicted next start time, the controller stops the controlling before a next start.

13. The system of claim 12, wherein the controller determines a control failure when the fuel cell vehicle is not started in the period from the reserved temperature increase time of the fuel cell to the predicted next start time, and stops the controlling before the next start when a number of control failures exceeds a predetermined fourth reference value.

14. The system of claim 1, further comprising a display unit receiving information regarding the predicted next start time from the controller and displaying the received information to the vehicle driver, wherein, when the predicted next start time is deduced, the controller transmits the information regarding the predicted next start time to the display unit.

15. A method of controlling the system of claim 1, the method comprising:

collecting, by the information collector, start pattern information of the vehicle driver including start dates, start positions, and start times of the fuel cell vehicle when the fuel cell vehicle is started;

classifying, by the controller, the start date in the start pattern information of the vehicle driver as the weekday group or the weekend group;

classifying, by the controller, the start position in which the start of the fuel cell vehicle is concentrated, in the start pattern information of the vehicle driver, as the single position group;

classifying, by the controller, the start time in which the start of the fuel cell vehicle is concentrated, in the start pattern information of the vehicle driver, as the single time group;

deducing, by the controller, the predicted next start time based on each of the groups when the fuel cell vehicle is stopped; and controlling, by the controller, the temperature increase of the fuel cell based on the predicted next start time when the fuel cell is stopped.

* * * * *